(12) United States Patent
Ung et al.

(10) Patent No.: US 10,395,278 B2
(45) Date of Patent: Aug. 27, 2019

(54) MOBILE DEVICE DETECTION AND ENGAGING

(71) Applicant: BlueFox, Inc., Sunnyvale, CA (US)

(72) Inventors: Hang Ung, Saratoga, CA (US); Guillaume Tenant de la Tour, Saratoga, CA (US); Jerome Lejeune, Saratoga, CA (US); Jan Willem Korver, AC Utrecht (NL); Thomas Sandholm, Saratoga, CA (US)

(73) Assignee: BlueFox, Inc., Sunnyvale, CA (US)

( * ) Notice: Subject to any disclaimer, the term of this patent is extended or adjusted under 35 U.S.C. 154(b) by 375 days.

(21) Appl. No.: 15/426,953

(22) Filed: Feb. 7, 2017

(65) Prior Publication Data

US 2017/0148063 A1 May 25, 2017

Related U.S. Application Data

(63) Continuation-in-part of application No. 15/006,057, filed on Jan. 25, 2016, now Pat. No. 9,769,625.
(Continued)

(51) Int. Cl.
*H04W 24/00* (2009.01)
*G06Q 30/02* (2012.01)
(Continued)

(52) U.S. Cl.
CPC ..... *G06Q 30/0267* (2013.01); *G06Q 30/0261* (2013.01); *H04L 67/24* (2013.01); *H04L 67/26* (2013.01); *H04W 4/04* (2013.01); *H04W 4/06* (2013.01); *H04W 4/14* (2013.01); *H04W 4/21* (2018.02); *H04W 4/30* (2018.02); *H04W 4/33* (2018.02); *H04W 12/08* (2013.01); *H04L 63/1425* (2013.01); *H04W 12/12* (2013.01)

(58) Field of Classification Search
CPC ........................................................ H04W 4/04
USPC ...................................................... 455/456.6
See application file for complete search history.

(56) References Cited

U.S. PATENT DOCUMENTS 7,733,836 B2 * 6/2010 Huseth .................... G01S 5/021
370/338
7,856,656 B1 12/2010 Kharvandikar et al.
(Continued)

FOREIGN PATENT DOCUMENTS

RU 2011127863 A 1/2013
RU 126862 U1 4/2013
(Continued)

OTHER PUBLICATIONS

International Search Report and Written Opinion dated Jun. 29, 2017, for International Patent Application No. PCT/US2017/017015, filed Feb. 8, 2017, 8 pages.
(Continued)

*Primary Examiner* — Amancio Gonzalez
(74) *Attorney, Agent, or Firm* — Perkins Coie LLP

(57) ABSTRACT

Mobile device detecting and engaging are described. A server can determine that a mobile device has connected with a wireless network at a physical location. The server can provide a captive portal of the wireless network to the mobile device to receive contact information for the mobile device. The server can then provide a message including information related to the physical location to the mobile device using the contact information.

20 Claims, 7 Drawing Sheets

Related U.S. Application Data

(60) Provisional application No. 62/107,193, filed on Jan. 23, 2015, provisional application No. 62/292,812, filed on Feb. 8, 2016.

(51) Int. Cl.

| | | |
|---|---|---|
| *H04L 29/08* | (2006.01) | |
| *H04W 4/06* | (2009.01) | |
| *H04W 4/14* | (2009.01) | |
| *H04W 4/30* | (2018.01) | |
| *H04W 12/08* | (2009.01) | |
| *H04W 4/21* | (2018.01) | |
| *H04W 4/04* | (2009.01) | |
| *H04W 4/33* | (2018.01) | |
| *H04L 29/06* | (2006.01) | |
| *H04W 12/12* | (2009.01) | |

(56) References Cited

U.S. PATENT DOCUMENTS

| | | | |
|---|---|---|---|
| 9,344,992 B2* | 5/2016 | Noonan | H04W 48/04 |
| 2008/0067244 A1 | 3/2008 | Marks et al. | |
| 2012/0190325 A1 | 7/2012 | Abu-Hakima et al. | |
| 2013/0058274 A1* | 3/2013 | Scherzer | H04L 63/107 |
| | | | 370/328 |
| 2013/0084835 A1* | 4/2013 | Scherzer | H04W 48/14 |
| | | | 455/414.1 |
| 2013/0290200 A1 | 10/2013 | Singhal et al. | |
| 2014/0033288 A1* | 1/2014 | Wynn | H04W 12/08 |
| | | | 726/7 |
| 2014/0189808 A1* | 7/2014 | Mahaffey | H04L 63/083 |
| | | | 726/4 |
| 2014/0195380 A1 | 7/2014 | Jamtgaard et al. | |
| 2015/0025937 A1 | 1/2015 | Turner, Jr. | |
| 2015/0103678 A1* | 4/2015 | Fisbein | H04W 12/06 |
| | | | 370/252 |
| 2015/0356594 A1 | 12/2015 | Lusted et al. | |
| 2016/0110833 A1 | 4/2016 | Fix et al. | |
| 2016/0219411 A1 | 7/2016 | Tenant de la Tour et al. | |
| 2016/0286624 A1* | 9/2016 | Patel | H05B 37/0218 |
| 2017/0011348 A1* | 1/2017 | Ziskind | H04L 63/101 |
| 2017/0150325 A1 | 5/2017 | Mills et al. | |

FOREIGN PATENT DOCUMENTS

| | | |
|---|---|---|
| WO | 2014035307 A1 | 3/2014 |
| WO | 2014035308 A1 | 3/2014 |

OTHER PUBLICATIONS

Corrected Notice of Allowance dated Aug. 8, 2017 for U.S. Appl. No. 15/006,057 of Tenant de la Tour, G., et al., filed Jan. 25, 2016.
Notice of Allowance dated May 24, 2017 for U.S. Appl. No. 15/006,057 of Tenant de la Tour, G., et al., filed Jan. 25, 2016.
Non-Final Office Action dated Oct. 2, 2017 for U.S. Appl. No. 15/426,945 of Mills, A., et al., filed Feb. 7, 2017.
International Search Report and Written Opinion dated Mar. 30, 2017, for International Application No. PCT/US2017/17018, 5 pages.
Non-Final Office Action dated Feb. 2, 2017 for U.S. Appl. No. 15/006,057 of Tenant de la Tour, G., et al., filed Jan. 25, 2016.
U.S. Appl. No. 15/426,945 of Mills, A. et al. filed Feb. 7, 2017.
Notice of Allowance dated Dec. 20, 2017 for U.S. Appl. No. 15/426,945 of Mills, A., et al., filed Feb. 7, 2017.

* cited by examiner

MOBILE DEVICE DETECTION AND ENGAGING

PRIORITY

The presently filed application is a continuation-in part application of U.S. patent application Ser. No. 15/006,057 entitled "Mobile Device Detection and Tracking," filed Jan. 25, 2016, which claims priority to U.S. Provisional Application No. 62/107,193, entitled "System and Method for Managing Digital Display Systems," filed Jan. 23, 2015; and U.S. Provisional Application No. 62/292,812, entitled "Mobile Device Detection and Tracking," filed Feb. 8, 2016, all of which are incorporated by reference herein in their entirety.

TECHNICAL FIELD

This disclosure relates to electronic data management, and in particular detecting and engaging mobile devices.

BACKGROUND

Traffic on web pages can be tracked to identify users and their activities on the web pages. This tracking data regarding users and their activities can be valuable. For example, the operators of the web pages can use the tracking data to determine which portions of the web pages are receiving the most page views. Marketers can also use the tracking data to target advertisements to the users. However, at physical locations (e.g., a retail store), similar tracking data can be difficult to generate because customers are not generating data that allows for tracking. Therefore, the identities and activities of customers at physical locations can be difficult to determine.

SUMMARY

Some of the subject matter described herein includes a method for detecting and engaging mobile devices, including determining, by a server, that a mobile device has connected with a wireless network to receive access to a first promotion corresponding to a physical location; providing, by a server, a captive portal of the wireless network to the mobile device, the captive portal providing a request for contact information corresponding to the mobile device; receiving, by the server, the contact information from the mobile device using the captive portal of the wireless network; and providing, by the server, a first message including information related to the first promotion to the mobile device in the physical location based on the contact information provided using the captive portal.

In some implementations, the method can include receiving, by the server, a first device identifier representing a unique identification of the mobile device, the device identifier received based on the mobile device scanning the wireless network; and associating, by the server, the contact information with the device identifier to represent that the mobile device was in the physical location.

In some implementations, the method can include receiving, by the server, a second device identifier representing the unique identification of the mobile device; determining, by the server, that the unique identification represented by the second device identifier is associated with the contact information; and providing, by the server, a second message related to a second promotion to the mobile device in the physical location based on the contact information, the first promotion and the second promotion being different.

In some implementations, the method can include determining, by the server, that the mobile device has left the physical location, the determination based on detecting that the unique identification of the mobile device is no longer detected; determining, by the server, that the first promotion was not effective; and providing, by the server, a second message related to the first promotion, the second message providing different information related to the first promotion than the first message.

In some implementations, the different information includes different terms related to the first promotion.

In some implementations, the unique identification corresponds to a media access control (MAC) address of the mobile device.

In some implementations, the method can include determining, by the server, one or both of characteristics of the mobile device or history of the mobile device in the physical location, wherein the information related to the first promotion is based on one or both of the characteristics of the mobile device or the history of the mobile device in the physical location.

Some of the subject matter described herein also includes an electronic device, including one or more processors; and memory storing instructions, wherein the processor is configured to execute the instructions such that the processor and memory are configured to determine that a mobile device has connected with a wireless network to receive access to a first promotion corresponding to a physical location; provide a captive portal of the wireless network to the mobile device, the captive portal providing a request for contact information corresponding to the mobile device; receive the contact information from the mobile device using the captive portal of the wireless network; and provide a first message including information related to the first promotion to the mobile device in the physical location based on the contact information provided using the captive portal.

In some implementations, the electronic device can receive a first device identifier representing a unique identification of the mobile device, the device identifier received based on the mobile device scanning the wireless network; and associate the contact information with the device identifier to represent that the mobile device was in the physical location.

In some implementations, the electronic device can receive a second device identifier representing the unique identification of the mobile device; determine that the unique identification represented by the second device identifier is associated with the contact information; and provide a second message related to a second promotion to the mobile device in the physical location based on the contact information, the first promotion and the second promotion being different.

In some implementations, the electronic device can determine that the mobile device has left the physical location, the determination based on detecting that the unique identification of the mobile device is no longer detected; determine that the first promotion was not effective; and provide a second message related to the first promotion, the second message providing different information related to the first promotion than the first message.

In some implementations, the different information includes different terms related to the first promotion.

In some implementations, the unique identification corresponds to a media access control (MAC) address of the mobile device.

In some implementations, the electronic device can determine one or both of characteristics of the mobile device or history of the mobile device in the physical location, wherein the information related to the first promotion is based on one or both of the characteristics of the mobile device or the history of the mobile device in the physical location.

Some of the subject matter described herein also includes a computer program product, including one or more non-transitory computer-readable media having computer program instructions stored therein, the computer program instructions being configured such that, when executed by one or more computing devices, the computer program instructions cause the one or more computing devices to determine that a mobile device has connected with a wireless network to receive access to a first promotion corresponding to a physical location; provide a captive portal of the wireless network to the mobile device, the captive portal providing a request for contact information corresponding to the mobile device; receive the contact information from the mobile device using the captive portal of the wireless network; and provide a first message including information related to the first promotion to the mobile device in the physical location based on the contact information provided using the captive portal.

In some implementations, the computer program instructions can cause the one or more computing devices to receive a first device identifier representing a unique identification of the mobile device, the device identifier received based on the mobile device scanning the wireless network; and associate the contact information with the device identifier to represent that the mobile device was in the physical location.

In some implementations, the computer program instructions can cause the one or more computing devices to receive a second device identifier representing the unique identification of the mobile device; determine that the unique identification represented by the second device identifier is associated with the contact information; and provide a second message related to a second promotion to the mobile device in the physical location based on the contact information, the first promotion and the second promotion being different.

In some implementations, the computer program instructions can cause the one or more computing devices to determine that the mobile device has left the physical location, the determination based on detecting that the unique identification of the mobile device is no longer detected; determine that the first promotion was not effective; and provide a second message related to the first promotion, the second message providing different information related to the first promotion than the first message.

In some implementations, the different information includes different terms related to the first promotion.

In some implementations, the computer program instructions can cause the one or more computing devices to determine one or both of characteristics of the mobile device or history of the mobile device in the physical location, wherein the information related to the first promotion is based on one or both of the characteristics of the mobile device or the history of the mobile device in the physical location.

DETAILED DESCRIPTION

This disclosure describes devices and techniques for tracking and engaging mobile devices. In one example, a customer carrying a mobile device (e.g., a smartphone) can enter a retail store (or other physical location). The retail store can set up a sign advertising a promotion or sale, for example, a coupon is available to provide a discount on an item available for purchase. The sign can indicate that the coupon can be provided on the customer's mobile device if they connect to a particular wireless network (e.g., a wireless local area network (WLAN) based on one of the Institute of Electrical and Electronics Engineers (IEEE) 802.11 standards). If the customer connects to the wireless network, a captive portal (e.g., a landing page that can be provided and displayed on the mobile device upon connecting to a wireless network) can be provided in which the customer is prompted to enter contact information (e.g., a phone number) to receive the coupon via a messaging mechanism such as text messaging.

Additionally, since the customer's mobile device can connect to wireless networks, a device identifier uniquely identifying the mobile device (e.g., a media access control (MAC) address) can also be determined as the mobile device searches, or scans, for the available wireless networks including the one indicated on the advertisement and related to the promotion. The device identifier and contact information can be associated with each other so that the next time the customer enters the retail store with the smartphone, another promotion can be provided to the customer using the messaging mechanism because the device identifier can be identified as belonging to a mobile device that has already been at the retail store. As a result, the second promotion can be provided to the mobile device without the customer having to proactively decide to engage with the advertisement by selecting a wireless network again.

Information regarding the customer associated with the mobile device, for example, how often they visit the store, what promotions they were interested in, etc. can also be registered. As a result, some of the activities of customers at physical locations can be determined. Moreover, the customers can be engaged based on their activities. This can allow for improved customer experiences and allow for stores to determine more information regarding their customers.

Figure 1:
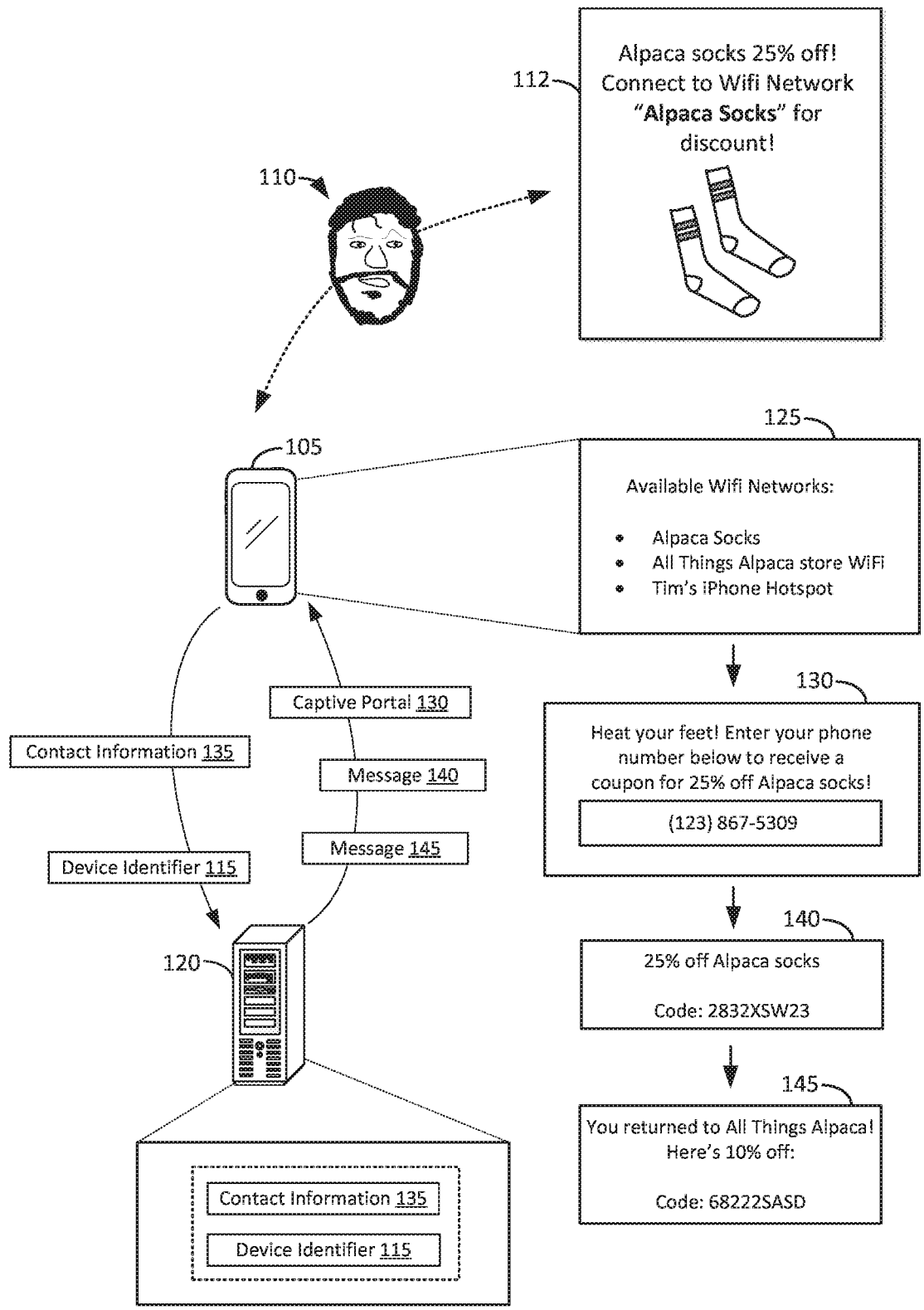
FIG. 1 illustrates an example of tracking and engaging a mobile device.

In more detail, FIG. 1 illustrates an example of tracking and engaging a mobile device. In FIG. 1, mobile device 105 can be a smartphone, tablet, laptop computer, smartwatch, or other electronic device that customer 110 has brought into a physical location or facility, such as a retail store. As customer 110 wanders around the retail store, he may view sign 112 indicating that the retail store is offering a promotion or sale (e.g., socks at 25% off) that is available if customer 110 connects to a specific wireless network. For example, a WLAN can have a service set identifier (SSID) representing a name for the network that can be set up by the retail store.

Because customer 110 is interested in the promotion, he can use smartphone 105 to see the available wireless networks that it can connect to. As smartphone 105 scans its environment to determine the available wireless networks, this exposes a device identifier of mobile device 105. For example, mobile device 105 can have a media access control (MAC) address that can serve as a unique identifier and assigned to its network interface controller (NIC). The MAC address can be determined by devices (e.g., network transceivers) of the wireless networks. Additional detail regarding this is detailed in U.S. patent application Ser. No. 15/006,057 entitled "Mobile Device Detection and Tracking," by Tenant de la Tour et al., and filed on Jan. 25, 2016, which was incorporated by reference in its entirety earlier herein. As a result, in FIG. 1, device identifier 115 can be provided to server 120. Server 120 can be part of a system or network including components providing the wireless network. The components can be included within the retail store, outside of the retail store, or a combination of both. Server 120 can then store this data to indicate that smartphone 105 has visited the retail location at least once. Server 120 can be one or more servers or other components, as discussed later.

As mobile device 105 scans the available wireless networks, it can then provide a listing (e.g., of the SSIDs) of the wireless networks for customer 110 to select one to connect with. In FIG. 1, this is portrayed with available wireless networks 125 as provided on a user interface (UI) on a display screen of mobile device 105. If customer 110 selects the wireless network indicated in sign 112 (e.g., the WLAN with the SSID mentioned on sign 112), then captive portal 130 can be provided by server 120 to mobile device 105. That is, by selecting the wireless network, this can provide an indication to server 120 that mobile device 105 has connected with the wireless network to receive access to the promotion mentioned in sign 112 at the retail store, and therefore, captive portal 130 should be provided.

A captive portal can be a "landing" or welcome page presented to mobile devices when connected to a wireless network that is configured to intercept data packets and prevent access to further resources or content other than the captive portal until some authentication, payment, acceptance of policy terms, etc. is performed using the captive portal. On some mobile devices, captive portal 130 can be automatically displayed upon connecting with the wireless network. On other mobile devices, a notification can be provided that a captive portal is available to view. On some mobile devices, customer 110 can launch a web browser and be forwarded to captive portal 130. In FIG. 1, captive portal 130 indicates that customer 110 should use mobile device 105 to provide his phone number to receive a coupon for the promotion (e.g., 25% off socks). When customer 110 submits his phone number, this can be provided to server 120 as contact information 135. In some implementations, captive portal 130 can be the only content accessible using the wireless network. That is, the wireless network set up for sign 112 might not provide access to the Internet or other networks.

Server 120 can associate contact information 135 with device identifier 115. That is, server 120 can link contact information 135 (e.g., a phone number) with device identifier 115 (e.g., a MAC address uniquely identifying mobile device 105). As discussed later herein, this can allow for server 120 to identify when mobile device 105 (presumably still operated by customer 110) has entered the retail store later and provide another message (e.g., providing another promotional coupon) without customer 110 having to select a wireless network, receive a captive portal, and provide a phone number. Rather, a message can be provided (e.g., via text messaging to the phone number corresponding to contact information 135) without further interaction involving customer 110 after the first time contact information 135 is provided and associated with device identifier 115.

Server 120 can provide message 140 providing the promotion indicated in sign 112 based on contact information 135. For example, because contact information 135 can provide the phone number of mobile device 105, a text message can be generated by server 120 and provided to mobile device 105 (e.g., via a cellular network used by mobile device 105). As depicted in FIG. 1, message 140 can provide a code that customer 110 can use (e.g., provide to a cashier, input into a self-check-out terminal, etc.), effectively being able to take advantage of the promotion indicated in sign 112. However, in other implementations, message 140 can include other content such as a hyperlink to a coupon available on the Internet, a bar code that can be scanned to provide the discount, an image, etc.

Customer 110 can then purchase the discounted item and leave the retail store. Later, when customer 110 returns to the retail store, mobile device 105 can be scanning for available wireless networks again. Because this exposes a unique identifier (e.g., MAC address) of mobile device 105 as previously discussed, device identifier 115 can be provided to server 120. Server 120 can determine that it has previously received information regarding device identifier 115, and therefore, customer 110 is a returning customer to the retail store. Accordingly, contact information 135 that is associated with device identifier 115 can be looked up and a second message 145 can be provided to mobile device 105, for example, offering another promotional discount on another item. As a result, customer 110 can be tracked and engaged in a physical location.

Figure 2A:
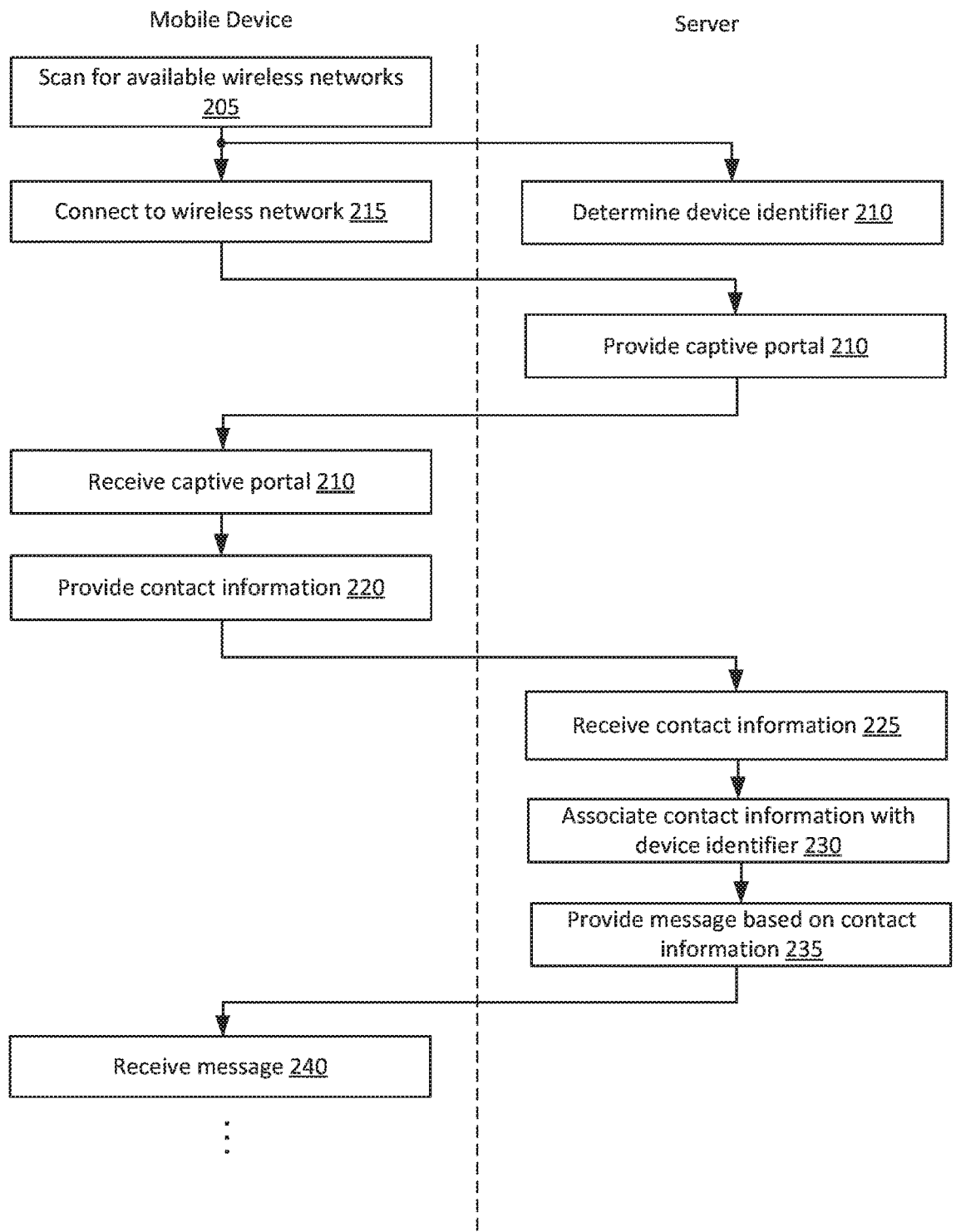
FIGS. 2A and 2B illustrate a block diagram for tracking and engaging a mobile device.
Figure 2B:
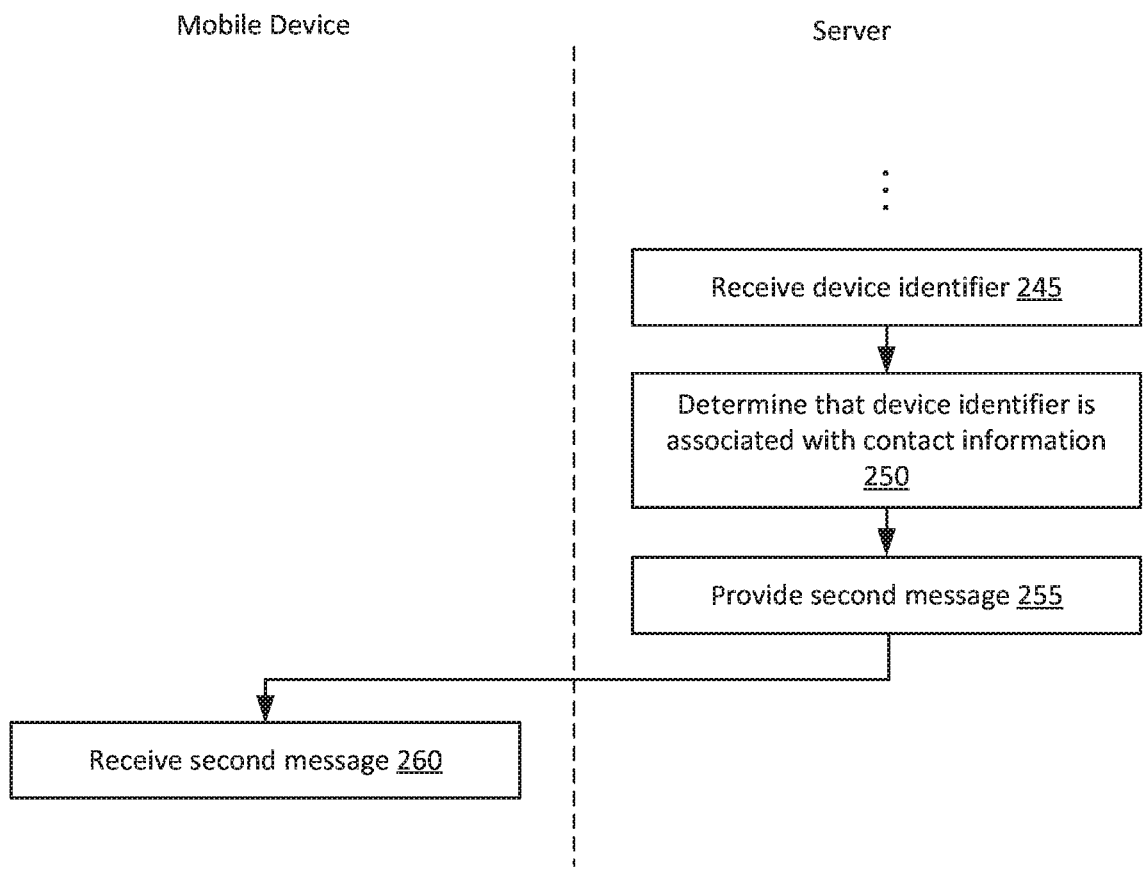

FIGS. 2A and 2B illustrate a block diagram for tracking and engaging a mobile device. In FIG. 2A, a customer can browse around a retail store with a mobile device. As the customer browses, the mobile device can scan for the available wireless networks in its environment (205). This results in a server receiving or determining and storing a device identifier of the mobile device (210). For example, in FIG. 1, mobile device 105 can have a unique identifier such as a MAC address that is able to be captured as mobile device 105 scans the available wireless networks. This unique identifier can be provided as device identifier 115 to server 120.

The customer can see an advertisement offering a discount on an item if they connect to a specific wireless network. For example, in FIG. 1, customer 110 can see that sign 112 is referring to a promotional discount on an item if he connects to a wireless network. As a result, the customer can use his mobile device to connect with the wireless network specified in the advertisement (215). For example, in FIG. 1, customer 110 can use mobile device 105 to communicatively connect with the wireless network mentioned in sign 112 and listed on available wireless networks 125.

The mobile device can connect with the selected wireless network and a captive portal can be provided (210). For example, in FIG. 1, captive portal 130 can be provided by server 120 to mobile device 105. The mobile device can receive the captive portal (210) and provide contact information using the captive portal (220). For example, in FIG. 1, captive portal 130 can indicate that a phone number should be provided to receive the promotional discount mentioned in sign 112.

The server can receive the contact information (225), associate the contact information with the previously received device identifier (230), and provide a message based on the contact information (235). For example, in FIG. 1, server 120 can receive contact information 130 and associate it with device identifier 115, for example, stored in a database. Server 120 can also provide message 140 providing a promotional code allowing customer 110 to engage in the promotion mentioned in sign 112. The mobile device can receive the message (240) and engage in the promotion. For example, customer 110 in FIG. 1 can then purchase the item mentioned in sign 112 at a discount using message 140.

The customer can then leave the store with the mobile device. Later, the customer can return to the retail store with the mobile device. The mobile device can scan for available wireless networks and the server can receive the device identifier again (245). For example, in FIG. 1, customer 105 can return to the retail store with mobile device 105 and device identifier 115 can be provided again to server 120. The server can determine that the device identifier is associated with contact information (250). For example, in FIG. 1, device identifier 115 and contact information 135 can already be stored (e.g., in a database) and associated with each other by server 120. This can indicate that customer 110 is a repeat customer. Because server 120 already has contact information 135 for device identifier 115, it can provide a second message to mobile device 105 (255). This can be done without providing a captive portal because server 120 does not need to receive contact information 135 again.

As a result, the mobile device can receive the second message (260). For example, in FIG. 1, mobile device 105 can receive message 145 providing another promotional discount on another item.

Figure 3:
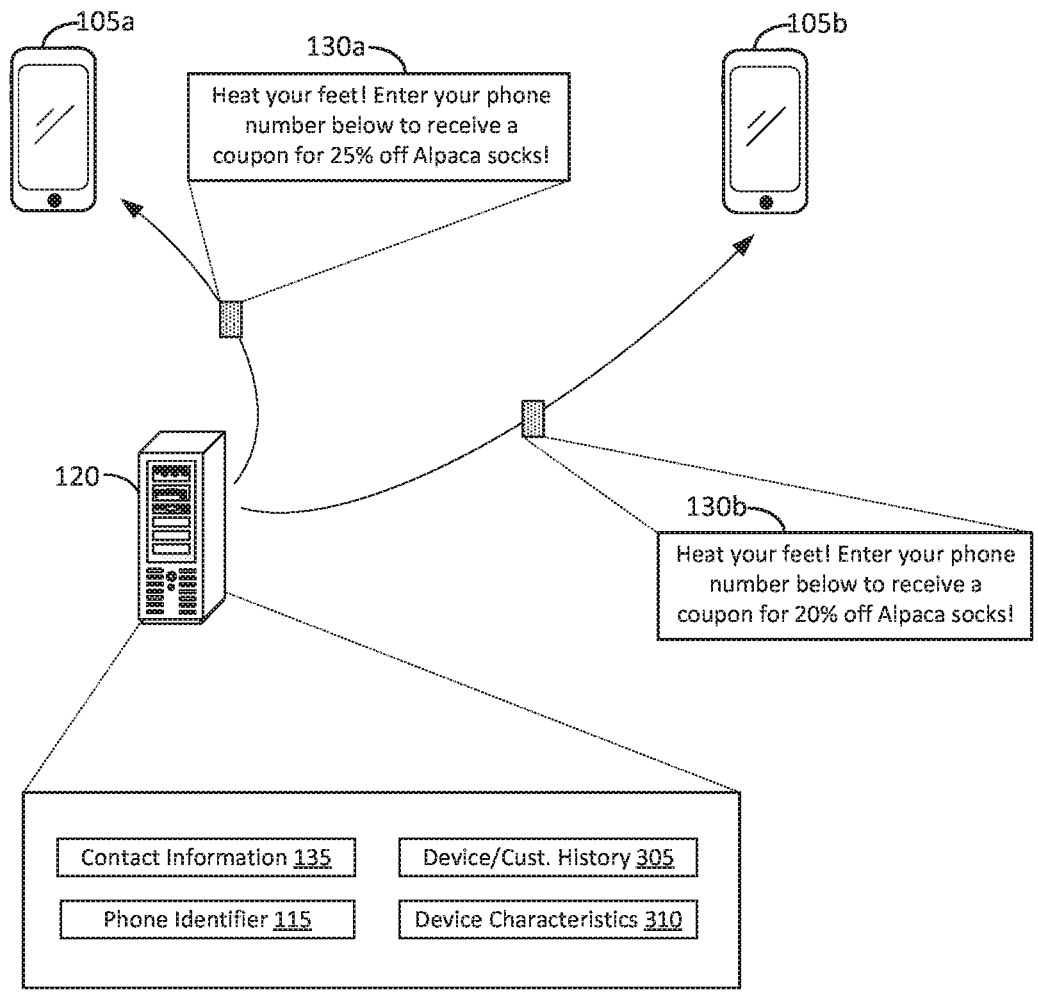
FIG. 3 illustrates an example of engaging two mobile devices differently based on history or mobile device characteristics.

Different captive portals and messages can be provided to mobile devices. FIG. 3 illustrates an example of engaging two mobile devices differently based on history or mobile device characteristics. For example, server 120 can provide mobile devices 105*a* and 105*b* captive portals 130*a* and 130*b*, respectively, based on their characteristics and history. Captive portals 130*a* and 130*b* can include different content (e.g., offering different discounts of an item for purchase).

In FIG. 3, mobile device 105*a* can belong to a new customer of a retail store. As a result, device identifier 115 corresponding to mobile device 105*a* can be determined by server 120, as previously discussed. Additionally, server 120 can determine characteristics of mobile device 105*a*. For example, when device identifier 115 is determined, some characteristics of mobile device 105*a* can also be provided to server 120. These characteristics can include a type of operating system (OS) used by mobile device 105*a* (e.g., Apple iOS, Android, etc.), the version of the OS, etc. Information regarding the characteristics can be stored by server as device characteristics 310. Additionally, device/customer history 305 can also be stored. For example, the dates/times when the customer bringing mobile device 105*a* into the retail store can be stored. Other types of information corresponding to activity of the customer or mobile device 105*a* within the retail store can include what was purchased (e.g., by having server 120 receive information regarding customer purchases), how often the customer goes to the retail store (e.g., the frequency of visits), the types of promotions they request to engage with, the type of customer (e.g., a customer categorized as a VIP), etc.

Based on device/customer history 305 and mobile device characteristics 310, server 120 can select a particular captive portal to provide to mobile device 105*a* when it connects with the wireless network. For example, in FIG. 3, captive portal 130*a* indicates that a 25% discount on an item can be provided. If the customer uses mobile device 105*a* to provide contact information 135, then a message offering access to the discount can be provided, as previously discussed.

By contrast, mobile device 105*b* can be provided captive portal 130*b* rather than captive portal 130*a*. Captive portal 130*b* indicates that a 20% discount on the item can be provided. That is, captive portal 130*b* offers different promotional terms than captive portal 130*a*. This might be done if device/customer history 305 and/or mobile device characteristics 310 are different for mobile device 105*a* and mobile device 105*b*. For example, a customer associated with a mobile device that is more frequently detected within the retail store might receive better promotions than a less frequently detected mobile device to reward loyal customers.

The above example describes providing different captive portals to provide different information related to the promotion. However, in other implementations, the same captive portal can be provided, but different messages can be provided to mobile devices 105*a* and 105*b* based on device/customer history 305 and/or mobile device characteristics 310.

Figure 4:
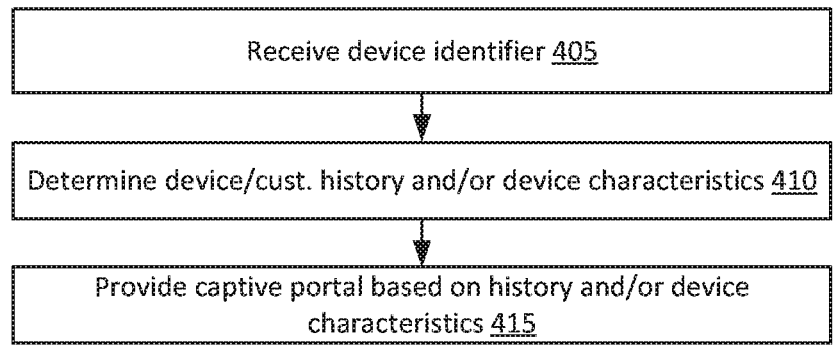
FIG. 4 illustrates a block diagram for engaging a mobile device based on history or mobile device characteristics.

FIG. 4 illustrates a block diagram for engaging a mobile device based on history or mobile device characteristics. In FIG. 4, a server can receive a device identifier of a mobile device (405). For example, in FIG. 3, mobile device 105*a* can provide its device identifier to server 120. Based on the device identifier, the server can determine the device/customer history, device characteristics, or both (410). For example, in FIG. 3, device/customer history 305 can include prior interactions of mobile device 105*a* within the retail store, or even other retail stores (e.g., other retail stores of the same chain). Based on those, the server can provide a captive portal to the mobile device (415). For example, in FIG. 3, captive portal 130*a* can be provided to mobile device 105*a*. If mobile device 105*b* has different device/customer history, device characteristics, or both, then captive portal 130*b* can be provided to it rather than captive portal 130*a*.

Figure 6:
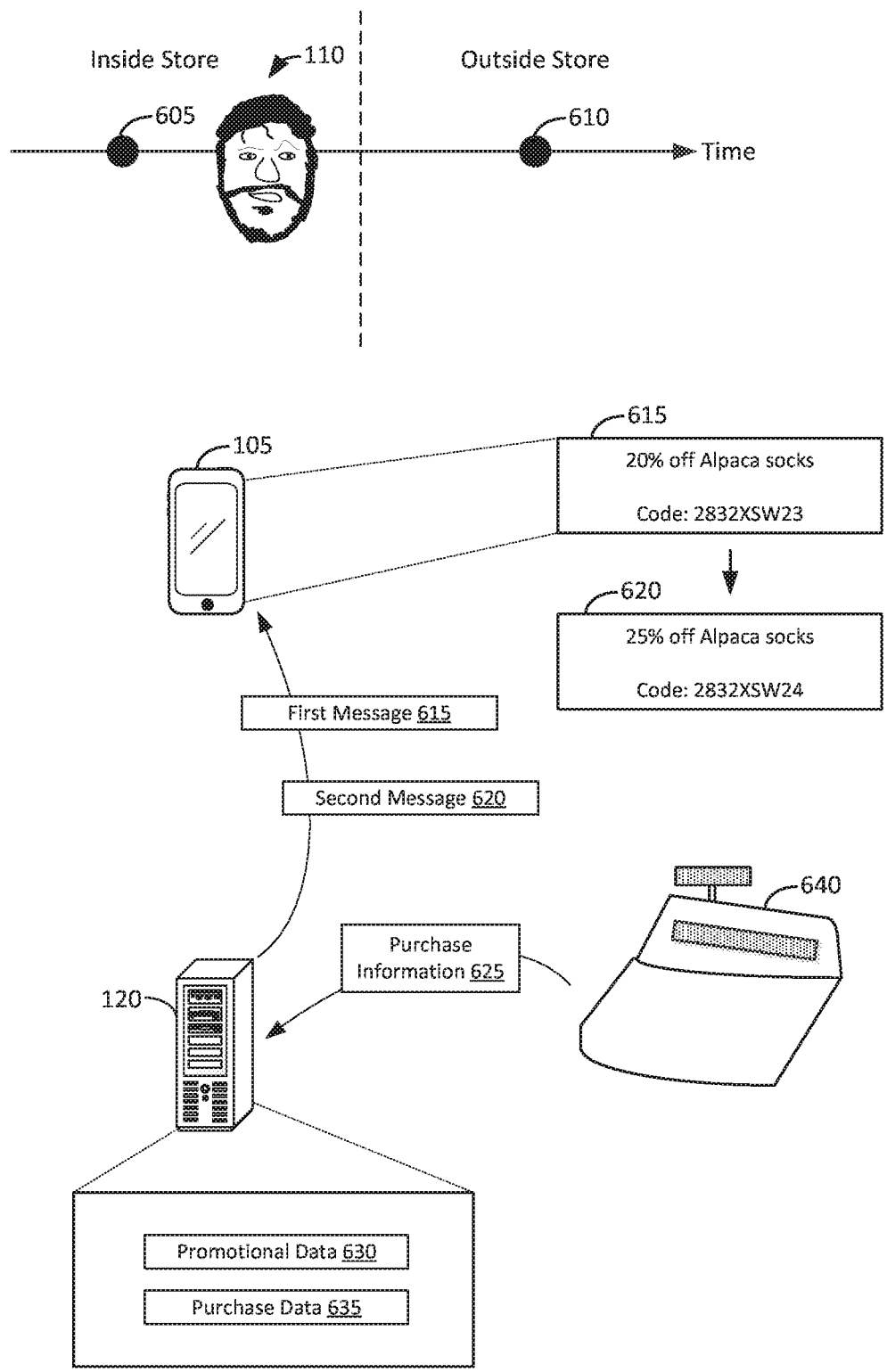
FIG. 6 illustrates an example of adjusting an engagement of a mobile device based on determining that a first engagement was not successful.

As discussed, a customer can bring a mobile device within a retail store and the presence of that mobile device can be detected based on its device identifier. A captive portal can be provided if the mobile device connects to a wireless network, and the contact information of the mobile device can be provided to receive a message providing access to a promotion. Later, the mobile device can receive messages without the use of the captive portal because its contact information and device identifier can be associated with each other. In some implementations, when the presence of the mobile device is no longer detected (e.g., the customer with the mobile device has left the store, and therefore the device identifier is no longer detected), then the promotional terms can be adjusted to entice the customer to return to make a purchase. FIG. 6 illustrates an example of adjusting an engagement of a mobile device based on determining that a first engagement was not successful.

In FIG. 6, at time 605, customer 110 can be inside a retail store with mobile device 105. As a result, first message 615 can be provided to mobile device 105. Server 120 can generate first message 615 by determining the promotional details using promotional data 630, which can include details regarding the promotions and messages that should be provided to mobile devices referencing the promotions. At time 610, customer 110 can leave the retail store with mobile device 105 without making a purchase. That is, customer 110 chose not to engage with the promotion provided by first message 615. This results in the device identifier of mobile device 105 no longer being detected (i.e., not scanned) because when it is outside of the store, the wireless network within the retail store cannot be detected by mobile device 105, and therefore, its device identifier is not provided to server 120. This can happen because the wireless network is not scanned by mobile device 105 when it is out of range.

Server 120 can then check whether a purchase was made by customer 110 using mobile device 105. For example, if customer 110 checked out via checkout terminal 640 (e.g., a cash register operated by an employee of the retail store) and purchased the item referenced in first message 615, then purchase information 625 can be generated by checkout terminal 640 and provided to server 120 indicating that a purchase was performed. This can be stored as purchase data 635 by server 120 in FIG. 6. If purchase data 635 does not include a purchase of the item referenced in first message 615 provided to mobile device 105, then this can indicate that mobile device 105 and customer 110 did not engage in the promotion. Accordingly, server 120 can generate second message 620 offering different promotional terms to encourage customer 110 to return to the retail store and make a purchase. For example, in FIG. 6, second message 620 includes better promotional terms (e.g., 25% off in second message 620 rather than 20% off as indicated in first message 615).

Figure 5:
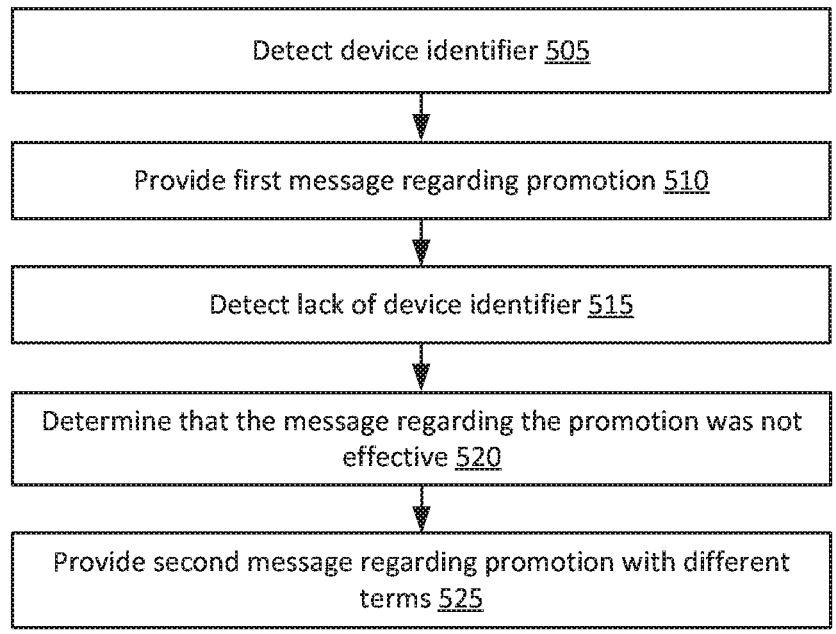
FIG. 5 illustrates a block diagram for adjusting an engagement of a mobile device based on determining that a first engagement was not successful.

FIG. 5 illustrates a block diagram for adjusting an engagement of a mobile device based on determining that a first engagement was not successful. In FIG. 5, a device identifier corresponding to a mobile device of a customer can be detected (505). For example, in FIG. 6, the device identifier (e.g., MAC address) of mobile device 105 can be detected when it scans for available wireless networks and that device identifier can be provided to server 120. A first message regarding a promotion can then be provided to the mobile device (510). For example, in FIG. 6, first message 615 offering a promotion can be provided to mobile device 105. If the mobile device leaves the retail store, then the lack of the device identifier can be detected (515). For example, server 120 might no longer be provided or detect the device identifier of mobile device 105. In some implementations, not detecting or receiving the device identifier for a threshold time period (e.g., five minutes) might indicate that mobile device 105, and therefore customer 110, have left the retail store. As a result, it can be determined that the first message regarding the promotion was not effective (520). For example, in FIG. 6, if customer 110 using mobile device 105 does not make a purchase including the item referenced in the promotion of first message 615 and the device identifier is no longer detected, then first message 615 can be considered to have been ineffective. A second message offering different promotional terms can then be provided to the mobile device (525). For example, in FIG. 6, second message 620 can be provided to mobile device 105. The second message includes different promotional terms (e.g., a better or higher discount) than the first message provided when mobile device 105 was detected to be within the retail store.

Many of the aforementioned examples discuss providing a message via text messaging to a phone number. However, in other examples, a message can be provided over other communication channels or mechanisms. For example, a mobile device can provide an email address for contact information and the message can be an email sent to the email address. Many of the aforementioned examples also discuss a wireless network that can be a WLAN (e.g., under one of the IEEE 802.11 standards). However, other types of wireless networks can be used. For example, a personal area network (PAN) such as Bluetooth® can also be used. Wireless cellular networks can also be used (e.g., 2G, 3G, 4G, Edge, H+, etc.). Many of the aforementioned examples also discuss a MAC address as a device identifier to uniquely identify devices. However, other types of device identifiers can also be used to uniquely identify devices.

Many of the examples herein discuss a retail store as a physical location. However, in other examples, the physical location can be a museum, restaurant, tourist attraction, amusement park, or other places.

Figure 7:
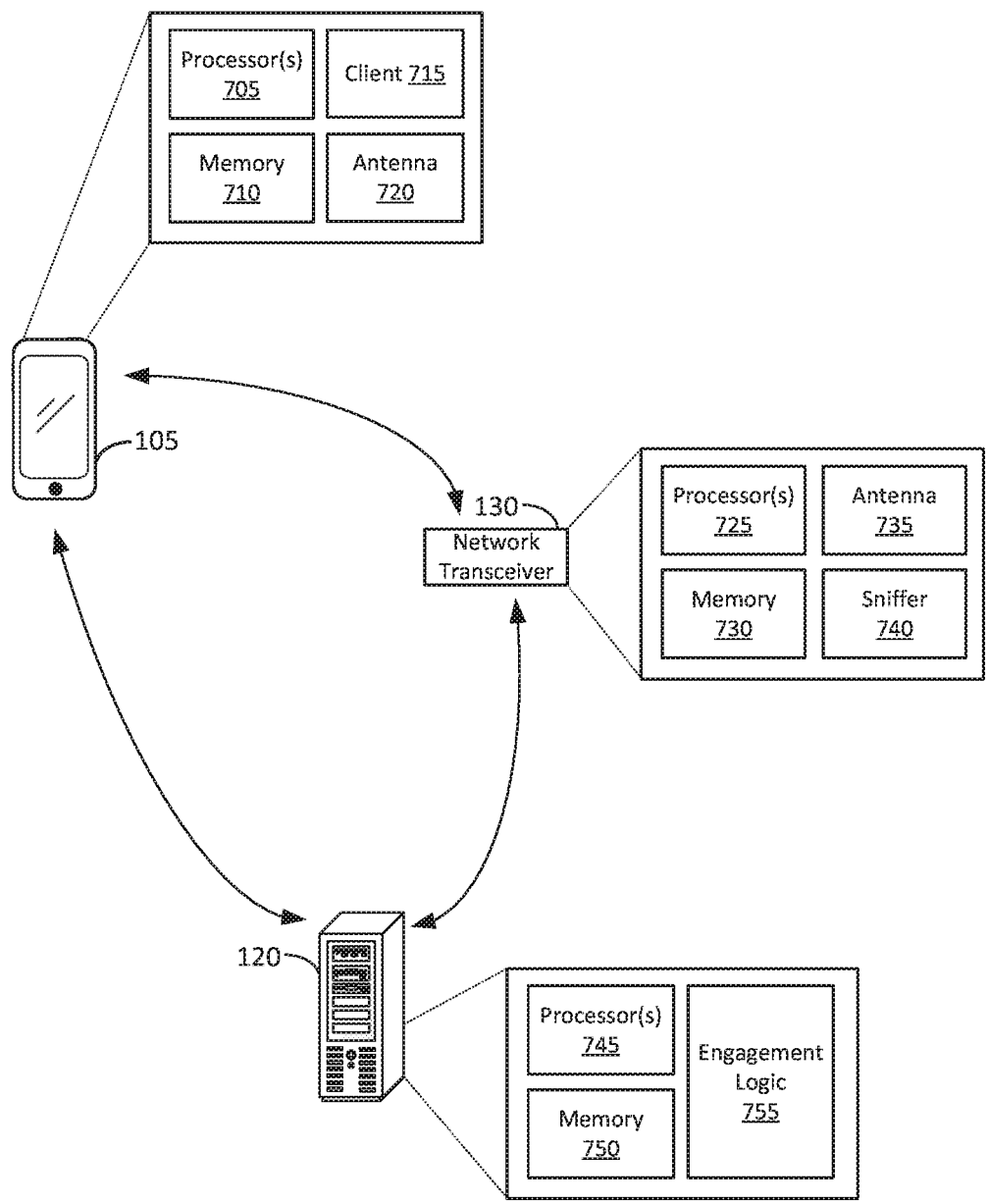
FIG. 7 illustrates an example of devices for tracking and engaging a mobile device.

FIG. 7 illustrates an example of devices for tracking and engaging a mobile device. In FIG. 7, mobile device 105 can be an electronic device including one or more processors 705 (e.g., circuits) and memory 710 storing instructions that can be executed by processors 705 to implement client 715 providing the functionality of mobile device 105 as described herein. For example, processors 705 and memory 710 can implement client 715 to provide a user interface (UI) to select a wireless network, display messages, etc. as disclosed herein and also receive and provide data related to server 120. Mobile device 105 can also include one or more input/output (I/O) devices including a display screen, touch sensors, etc. Memory 710 can be non-transitory computer-readable storage media. Mobile device 105 can also include antenna 720 to receive and transmit signals representing data wirelessly.

Network transceiver 130 can be an electronic device including one or more processors 725 (e.g., circuits), memory 730, and antenna 735 to implement sniffer 740 as further discussed in U.S. patent application Ser. No. 15/006,057 entitled "Mobile Device Detection and Tracking," by Tenant de la Tour et al., and filed on Jan. 25, 2016, which was incorporated by reference in its entirety earlier herein. Accordingly, memory 730 can be non-transitory computer-readable storage media storing instructions that can be executed by processors 725 to provide functionality of sniffer 740 and other functionality of network transceiver 130, including providing a wireless network, receiving device identifiers (e.g., MAC addresses), etc. as disclosed herein.

Server 120 can include one or more processors 745 and memory 750 to implement engagement logic 755 to implement the features described regarding server 120 herein. Accordingly, memory 750 can be non-transitory computer-readable storage media storing instructions that can be executed by processors 745 to provide functionality of server 120 as disclosed herein.

In some implementations, network transceiver 130 can be in the retail store with mobile device 105 and server 120 can be at a remote location. As a result, network transceiver 130 can provide information to server 120, such as the device identifier of mobile device 105. In some implementations, server 120 can be in the same location as network transceiver 130. In some implementations, the functionality of network transceiver 130 and server 120 an be integrated into a single device. In some implementations, server 120 can be a distributed server including several computing systems.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for detecting and engaging mobile devices, comprising:
    determining, by a server, that a mobile device has connected with a wireless network to receive access to a first promotion corresponding to a physical location;
    providing, by the server, a captive portal of the wireless network to the mobile device, the captive portal providing a request for contact information corresponding to the mobile device;
    receiving, by the server, the contact information from the mobile device using the captive portal of the wireless network; and
    providing, by the server, a first message including information related to the first promotion to the mobile device in the physical location based on the contact information provided using the captive portal.

2. The method of claim 1, further comprising:
    receiving, by the server, a first device identifier representing a unique identification of the mobile device, the device identifier received based on the mobile device scanning the wireless network; and
    associating, by the server, the contact information with the device identifier to represent that the mobile device was in the physical location.

3. The method of claim 2, further comprising:
    receiving, by the server, a second device identifier representing the unique identification of the mobile device;
    determining, by the server, that the unique identification represented by the second device identifier is associated with the contact information; and
    providing, by the server, a second message related to a second promotion to the mobile device in the physical location based on the contact information, the first promotion and the second promotion being different.

4. The method of claim 2, further comprising:
    determining, by the server, that the mobile device has left the physical location, the determination based on detecting that the unique identification of the mobile device is no longer detected;
    determining, by the server, that the first promotion was not effective; and
    providing, by the server, a second message related to the first promotion, the second message providing different information related to the first promotion than the first message.

5. The method of claim 4, wherein the different information includes different terms related to the first promotion.

6. The method of claim 2, wherein the unique identification corresponds to a media access control (MAC) address of the mobile device.

7. The method of claim 1, further comprising:
    determining, by the server, one or both of characteristics of the mobile device or history of the mobile device in the physical location, wherein the information related to the first promotion is based on one or both of the characteristics of the mobile device or the history of the mobile device in the physical location.

8. An electronic device, comprising:
    one or more processors; and
    memory storing instructions, wherein the processor is configured to execute the instructions such that the processor and memory are configured to:
        determine that a mobile device has connected with a wireless network to receive access to a first promotion corresponding to a physical location;
        provide a captive portal of the wireless network to the mobile device, the captive portal providing a request for contact information corresponding to the mobile device;
        receive the contact information from the mobile device using the captive portal of the wireless network; and
        provide a first message including information related to the first promotion to the mobile device in the physical location based on the contact information provided using the captive portal.

9. The electronic device of claim 8, wherein the processor is configured to execute the instructions such that the processor and memory are configured to:
    receive a first device identifier representing a unique identification of the mobile device, the device identifier received based on the mobile device scanning the wireless network; and
    associate the contact information with the device identifier to represent that the mobile device was in the physical location.

10. The electronic device of claim 9, wherein the processor is configured to execute the instructions such that the processor and memory are configured to:
    receive a second device identifier representing the unique identification of the mobile device;
    determine that the unique identification represented by the second device identifier is associated with the contact information; and
    provide a second message related to a second promotion to the mobile device in the physical location based on the contact information, the first promotion and the second promotion being different.

11. The electronic device of claim 9, wherein the processor is configured to execute the instructions such that the processor and memory are configured to:
    determine that the mobile device has left the physical location, the determination based on detecting that the unique identification of the mobile device is no longer detected;
    determine that the first promotion was not effective; and
    provide a second message related to the first promotion, the second message providing different information related to the first promotion than the first message.

12. The electronic device of claim 11, wherein the different information includes different terms related to the first promotion.

13. The electronic device of claim 9, wherein the unique identification corresponds to a media access control (MAC) address of the mobile device.

14. The electronic device of claim 8, wherein the processor is configured to execute the instructions such that the processor and memory are configured to:
    determine one or both of characteristics of the mobile device or history of the mobile device in the physical location, wherein the information related to the first promotion is based on one or both of the characteristics of the mobile device or the history of the mobile device in the physical location.

15. A computer program product, comprising one or more non-transitory computer-readable media having computer program instructions stored therein, the computer program instructions being configured such that, when executed by one or more computing devices, the computer program instructions cause the one or more computing devices to:

determine that a mobile device has connected with a wireless network to receive access to a first promotion corresponding to a physical location;

provide a captive portal of the wireless network to the mobile device, the captive portal providing a request for contact information corresponding to the mobile device;

receive the contact information from the mobile device using the captive portal of the wireless network; and provide a first message including information related to the first promotion to the mobile device in the physical location based on the contact information provided using the captive portal.

16. The computer program product of claim 15, wherein the computer program instructions cause the one or more computing devices to:

receive a first device identifier representing a unique identification of the mobile device, the device identifier received based on the mobile device scanning the wireless network; and associate the contact information with the device identifier to represent that the mobile device was in the physical location.

17. The computer program product of claim 16, wherein the computer program instructions cause the one or more computing devices to:

receive a second device identifier representing the unique identification of the mobile device;

determine that the unique identification represented by the second device identifier is associated with the contact information; and provide a second message related to a second promotion to the mobile device in the physical location based on the contact information, the first promotion and the second promotion being different.

18. The computer program product of claim 16, wherein the computer program instructions cause the one or more computing devices to:

determine that the mobile device has left the physical location, the determination based on detecting that the unique identification of the mobile device is no longer detected;

determine that the first promotion was not effective; and provide a second message related to the first promotion, the second message providing different information related to the first promotion than the first message.

19. The computer program product of claim 18, wherein the different information includes different terms related to the first promotion.

20. The computer program product of claim 15, wherein the computer program instructions cause the one or more computing devices to:

determine one or both of characteristics of the mobile device or history of the mobile device in the physical location, wherein the information related to the first promotion is based on one or both of the characteristics of the mobile device or the history of the mobile device in the physical location.

* * * * *